United States Patent [19]

Pettersen

[11] Patent Number: 5,445,744
[45] Date of Patent: Aug. 29, 1995

[54] METHOD AND A DEVICE FOR THE COLLECTION OF OIL SLICKS ON A WATER SURFACE

[76] Inventor: Odd Pettersen, N-4640 Sogne, Norway

[21] Appl. No.: 117,021

[22] PCT Filed: Mar. 6, 1992

[86] PCT No.: PCT/NO92/00041
§ 371 Date: Sep. 8, 1993
§ 102(e) Date: Sep. 8, 1993

[87] PCT Pub. No.: WO/9215481
PCT Pub. Date: Sep. 17, 1992

[30] Foreign Application Priority Data

Mar. 8, 1991 [NO] Norway .................. 910920

[51] Int. Cl.6 .................................. E02B 15/04
[52] U.S. Cl. ................... 210/776; 210/242.3; 210/923
[58] Field of Search ............ 210/776, 242.3, 923

[56] References Cited

U.S. PATENT DOCUMENTS

| 3,630,376 | 12/1971 | Price. | |
|---|---|---|---|
| 3,662,891 | 5/1972 | Headrick. | |
| 3,684,095 | 8/1972 | Ayers | 210/242.3 |
| 3,716,142 | 2/1973 | Bianchi | 210/923 |
| 3,726,406 | 4/1973 | Damberger. | |
| 3,847,815 | 11/1974 | Chastan-Bagnis. | |
| 4,264,444 | 4/1981 | Bronnec | 210/923 |
| 5,030,363 | 7/1991 | Pale | 210/923 |
| 5,108,600 | 4/1992 | Rees et al. | 210/242.3 |

FOREIGN PATENT DOCUMENTS

| 0357239 | 3/1990 | European Pat. Off. . |
|---|---|---|
| 2045290 | 2/1971 | France . |
| 3416683 | 11/1985 | Germany . |
| 3347988 | 6/1987 | Germany . |
| 3615499 | 4/1988 | Germany . |
| 900214 | 7/1991 | Norway . |
| 2038195 | 7/1980 | United Kingdom . |
| 2064971 | 6/1981 | United Kingdom . |
| 2145005 | 3/1985 | United Kingdom . |
| 958583 | 8/1988 | U.S.S.R. . |

*Primary Examiner*—Robert A. Dawson
*Assistant Examiner*—David Reifsnyder
*Attorney, Agent, or Firm*—Cushman Darby & Cushman

[57] ABSTRACT

A method for collection of oil slicks (20) on a water surface, using a barge (1) or similar vessel, with a rectangular, transversal bow section (4) and which is towed by a towboat (5). There is at least one collection device (8) designed to lead oil in toward the bow section (4) of the barge (1). The water below the oil film (20) in front of the bow section (4) of the barge (1) is set in an upward flow, so that water is led up from the water surface, entraining the oil film (20) and across the forward, transversal bow edge (4) and into a tank room (3) in the barge (1). The water in the lower portion of the tank room (3) is led or flows freely into the surrounding water. Outside the bow section (4) there is fastened a device, e.g., a rotating drum (12) or nozzles (20), directed so as to have an upward slant, designed to produce an upward flow of the surrounding water immediately in front of the transversal bow section, sufficiently strong to accelerate the water in an upward slanting direction, which entrains oil from the oil film (14) across the transversal bow section (4).

17 Claims, 4 Drawing Sheets

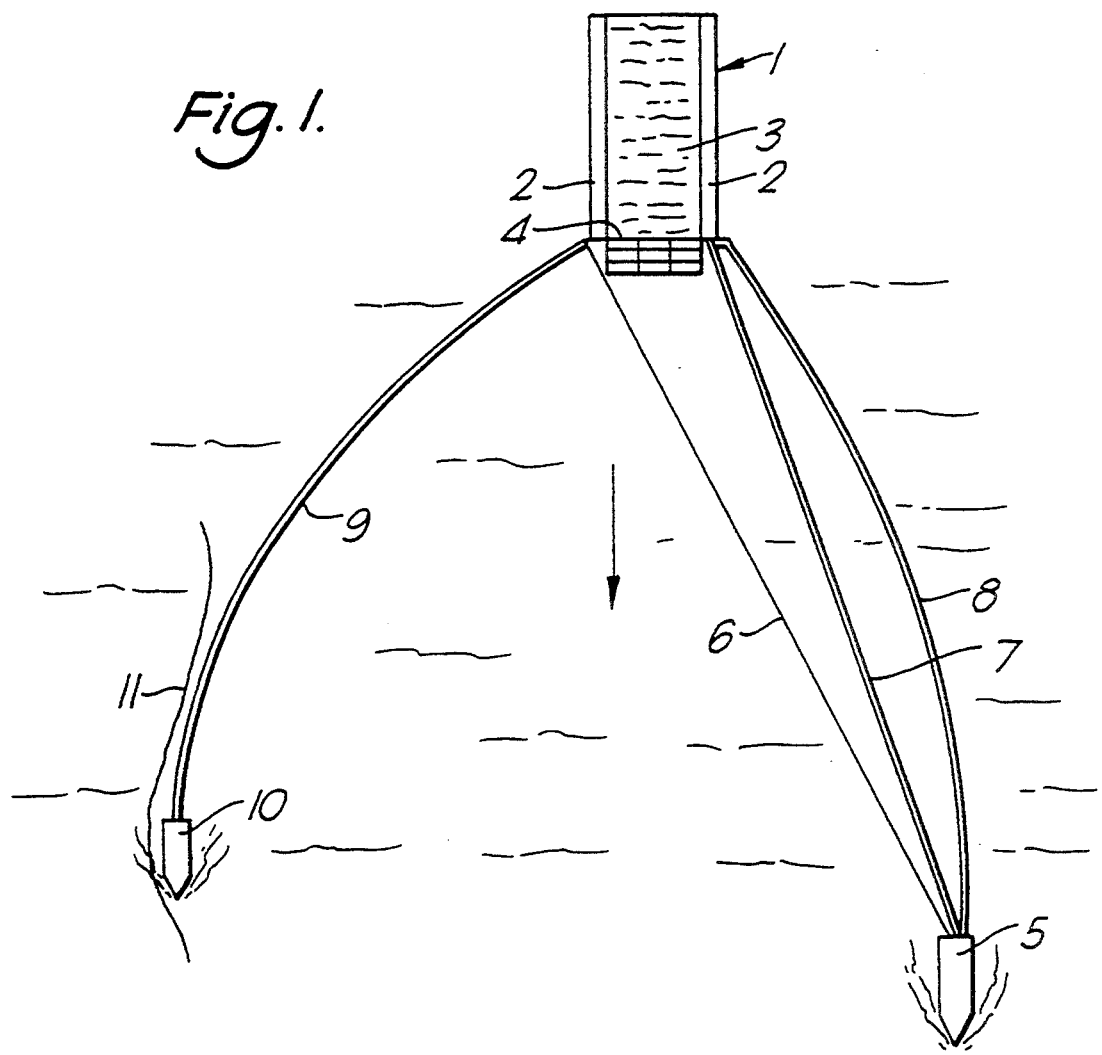
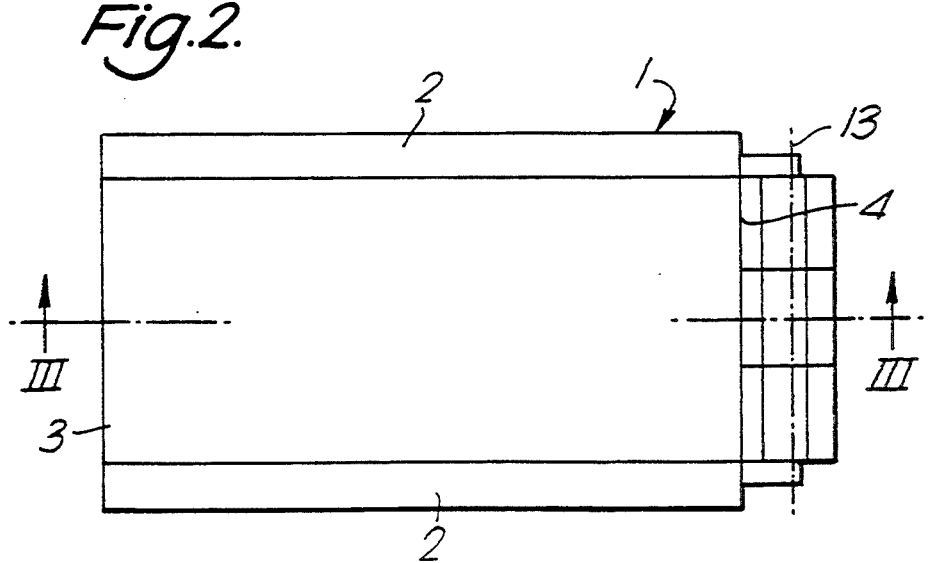

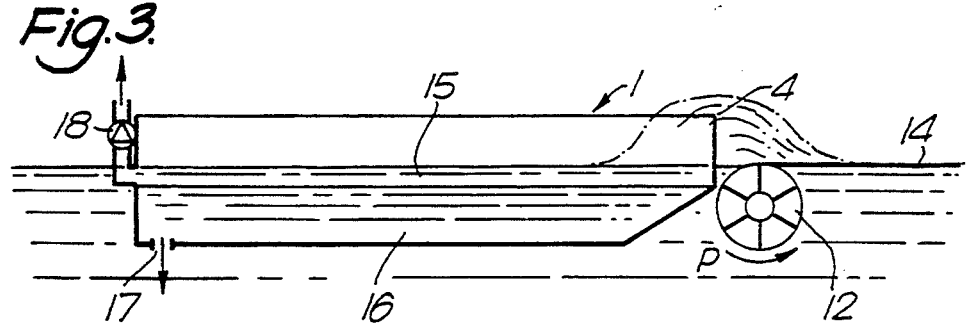
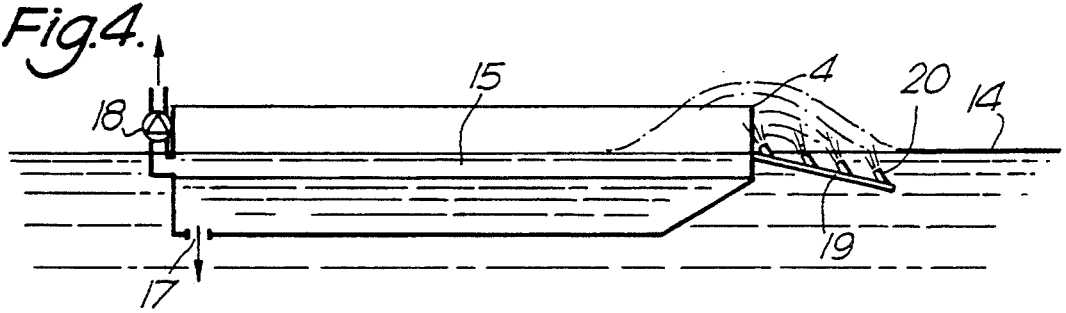
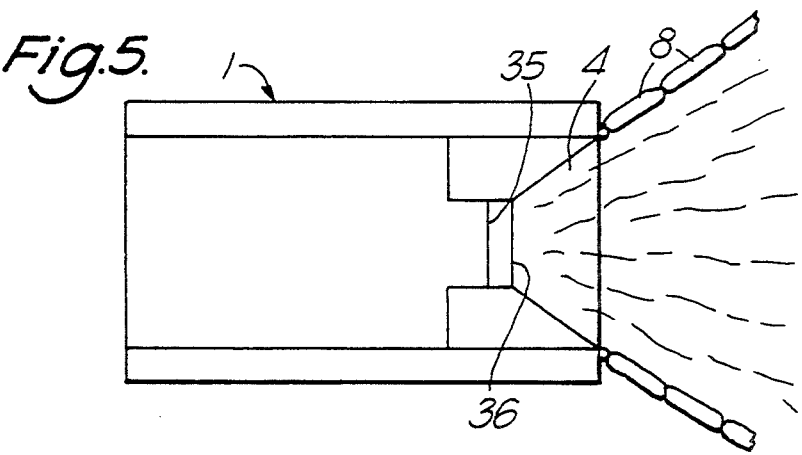
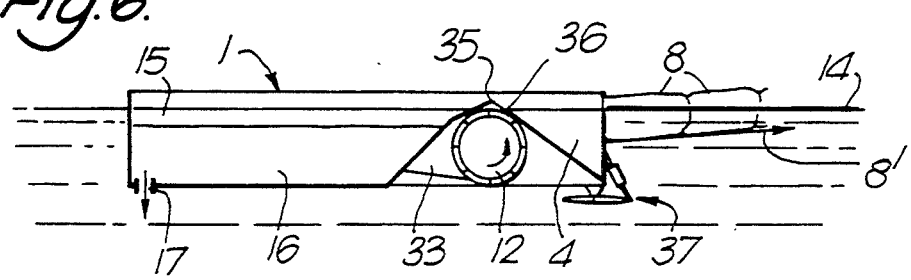
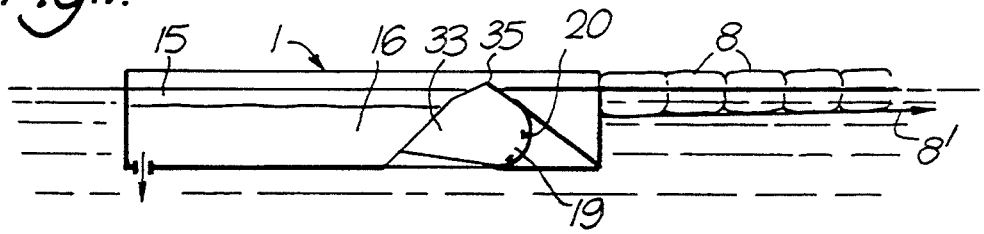

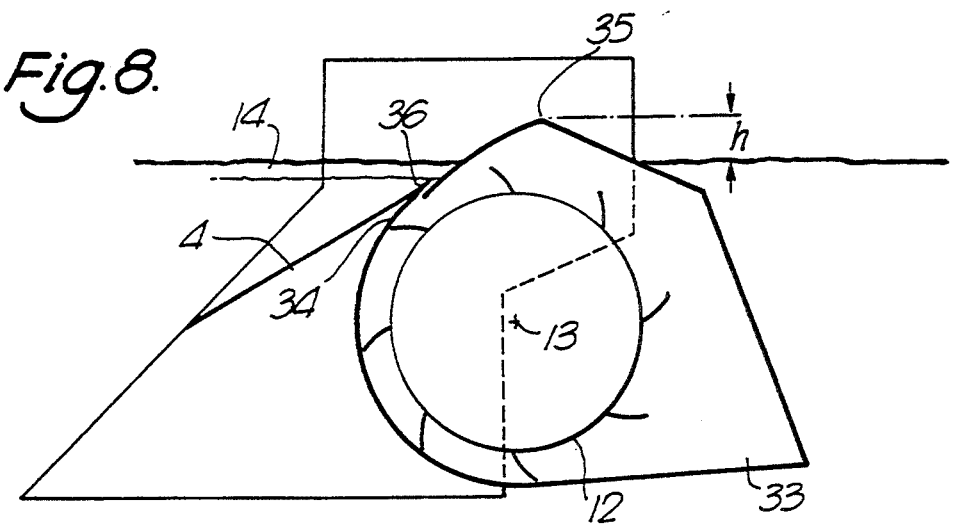
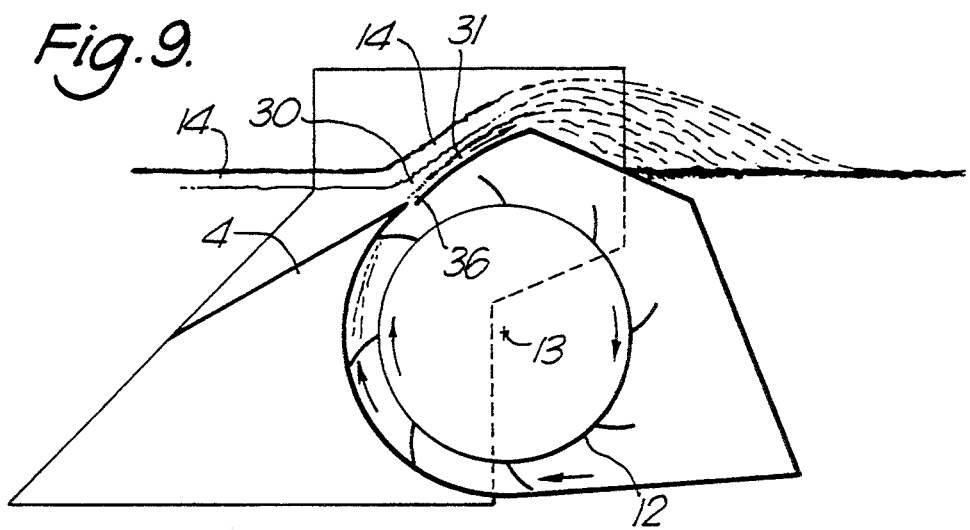
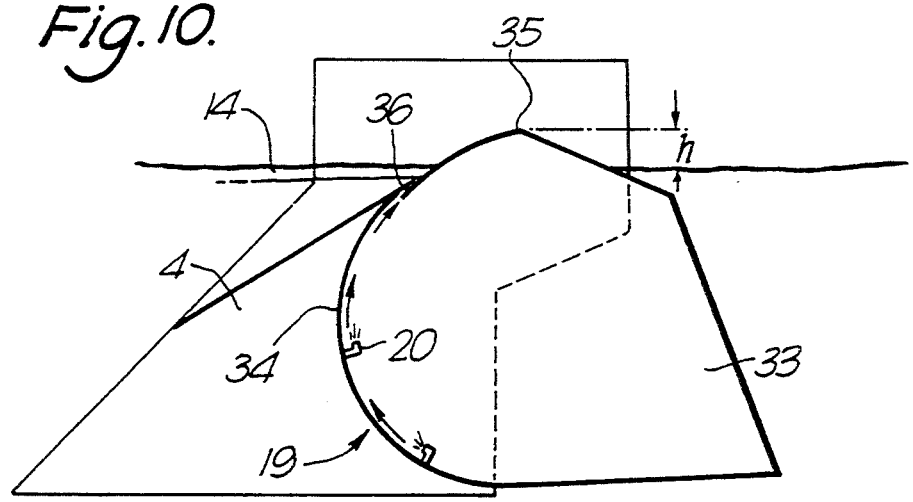

METHOD AND A DEVICE FOR THE COLLECTION OF OIL SLICKS ON A WATER SURFACE

BACKGROUND OF THE INVENTION

The present invention relates to a method and a device for the collection of oil slicks on a water surface, using a floating collection container in the form of a barge or similar vessel with a receiving bow section and a collection device, such as an oil boom, designed to collect at least some portions of an oil slick.

It seems inevitable that large quantities of oil leak from tankers, oil platforms and installations ashore, ending up in the sea and in lakes. Since oil is lighter than water, this will rent, in as a film on the water surface. Such a floating layer of oil may have an unfavourable influence on marine life and, if it should drift toward land, it may spoil the shores, in that the oil may foul up beaches, docks, fish farms, etc. Large oil spills at sea are considered catastrophies. Even minor oil spills at a dock or in a coastal region may be quite serious and may entail heavy costs.

A number of different methods and devices have been proposed for the collection of oil on water. One known method is to block or capture an oil slick by means of so-called oil booms. An oil boom consists of a long floating member, e.g. a plastic pipe, which on its underside has a skirt with weights at its lower edge so that the skirt hangs down in the water from the floating member. With sufficient lengths of such oil booms, it is possible to limit the spread of an oil slick on the water under favourable weather conditions. However, practical use of oil booms have shown that even a moderate current with a speed of one knot will force the oil down under the skirt of the oil boom. Should there be waves of one meter or higher, the use of oil booms will represent great difficulties. There have also been proposed vessels for direct collection of oil slicks on the water surface. From German patent No. 3347988 there is known a vessel which has an open well at the bow, where a conveyor belt runs from a level under the water surface to a higher level, designed to transport oil inside a tank in the vessel. From European patent application No. 0357239 is known a similar device where the transport system consists of a conveyor belt with open mesh, on which is mounted equipment for supplying intensive heat to the transported oil for liquefaction of the transported oil, so that the oil slides off the conveyor belt when it is led into the vessel.

The latter publication points out an important problem for all collection of oil from the ocean surface. A major portion of the oil that ends up in the sea is crude oil, thus a very viscous oil. Such an oil will adhere extremely well to everything it comes into contact with. The known collection devices will therefore soon be covered with oil and will have such a thick layer that the devices scarcely will be able to function. In the European patent, all attempt has been made to remedy this problem by heating the oil which has adhered to the collection devices, in order to transform this viscous oil into a more liquid kind, making it possible to remove it from the collection device.

U.S. Pat. No. 3,684,095 shows a barge-based collection system for an oil slick. The barge is used together with booms. U.S. Pat No. 3,726,406 shows a capturing system by using oil booms, as well as water nozzles which are located under the water surface in order to channel a captured oil slick across an edge for collection. Further examples of the state of the art are shown in U.S. Pat. No. 3,662,891, U.S. Pat. No. 3,847,815, DE-3.416.683, GB-2.064.971 A and SU-95 85 83.

SUMMARY OF THE INVENTION

The purpose of the present invention is to provide a method and a device for the collection of oil, also heavy, viscous oil, where the said drawbacks are avoided so that the collection device is not fouled up by heavy, viscous oil.

According to the invention this is achieved by a method of the formerly mentioned art, which is characterized in that the collection container is located downstream of, adjacent to the collection device and the oil slick on the water surface is forced to move toward the receiving section of the bow, and that a limited water layer immediately below the oil slick in front of the receiving bow section is set in a flow that is directed upward and downstream so that the water layer is raised from the surrounding water level, entraining the supernatant oil slick and transferring it over a threshold in the receiving bow section and down into the collection container.

The water and the oil in the collection container is advantageously separated countinuously into an upper oil phase and a lower water phase which is continuously led out of the collection container after first having been mixed.

The collection container and the collection device may be kept in a stationary position and the current in the water will advantageously produce a relative movement between the collection container and the surrounding water surface. Alternatively, the surrounding water surface may be mainly without a current and the collection container and the collection device are towed across the water surface and produce the necessary relative movement between the collection container and the surrounding water surface.

In conformance with the present invention, there is also prepared a device of the art mentioned in the introduction which is characterized in that the collection container is placed downstream of and adjacent to the collection device in such a manner that the oil slick on the water surface is channelled toward the receiving bow section, and that in front of the bow there is placed a device substantially under the water surface, designed to produce a flow in an upward and downstream direction in a limited water level immediately below the oil slick in front of the receiving bow section. A threshold is placed in the receiving bow section over which threshold the flow of the limited water level is led, entraining the supernatant oil slick.

The device for producing the directed flow may be one under the waterline operable paddle wheel with its rotation axis running across the longitudinal axis of the collection container; alternatively, it may be a plurality of water nozzles, positioned in a predetermined pattern and with regard to direction.

The device for bringing about the directed flow is advantageously positioned in a housing which is partly closed, which housing has portions designed according to flow-dynamic principles and which has at least one slit through which a water layer created by the device is led for entrainment of the limited water layer and the supernatant oil slick. The collection container may advantageously include adjustable screen devices for adjusting the draught of the collection container.

The receiving bow section may also advantageously have a plurality of baffles, which may be adjustable, and which divert the water current, that does not move across the threshold, past the housing. The baffles may be connected to the receiving bow section at any location which would permit them to direct the water that does not traverse the threshold.

BRIEF DESCRIPTION OF THE DRAWING

In the following the invention will be explained in more detail, with reference to the drawings in which:

FIG. 1 schematically shows an embodiment of the device according to the invention;

FIG. 2 shows a top plan view of a barge to be used with the device,

FIG. 3 shows a cross section through the barge in FIG. 2 along the line III—III;

FIG. 4 shows a longitudinal section through a modified embodiment for a barge;

FIG. 5 shows a top plan view of a second embodiment of the collection container or the barge according the invention;

FIG. 6 shows a schematic side view of the barge according to FIG. 5;

FIG. 7 shows a schematic side view of the barge according to FIG. 6 in an alternative embodiment;

FIG. 8 shows a schematic side view and in large scale the receiving bow section of the barge according to the embodiment shown in FIGS. 5 and 6, but not in operation;

FIG. 9 shows the same side view as FIG. 8, but in operation;

FIG. 10 shows an alternative embodiment of the receiving bow section shown in FIGS. 8 and 9.

DETAILED DESCRIPTION

Figure 11:
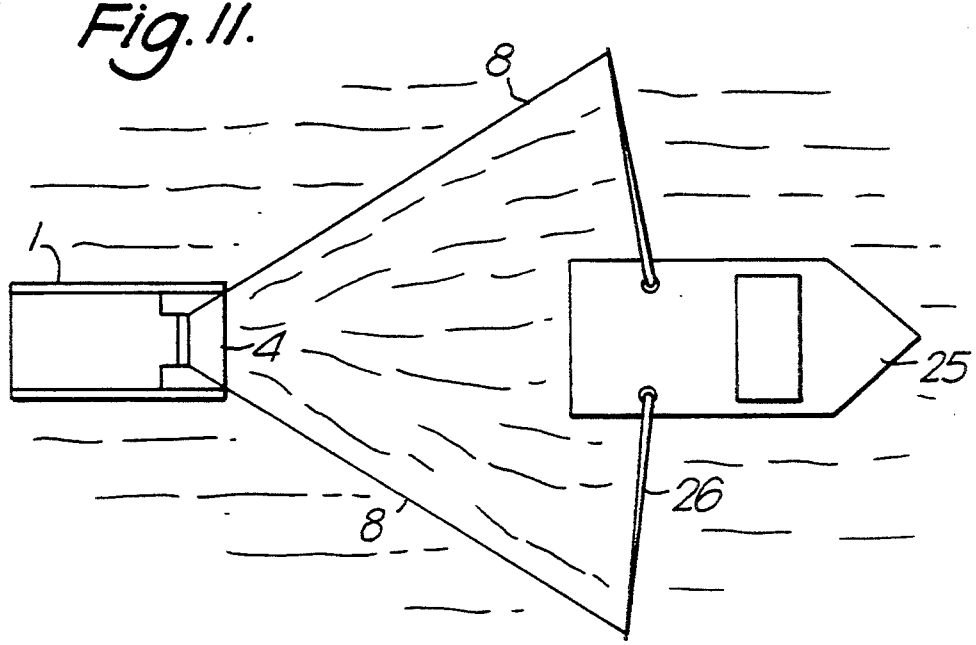
FIG. 11 shows schematically a collection container towed by a vessel through its booms.

The device shown in FIG. 1-4 for the collection of oil slicks on a water surface consists of a flat barge 1 with lateral tanks 2, and a central tank 3 which occupies most of the vessel. The bow consists of a straight transversal edge 4. The barge is towed by a towboat 5 across tow rope 6, 7. To, e.g. tow rope 7 there may be fastened a transfer conveyor, for instance a pressure hose for the transfer of a hydraulic drive medium to the barge from the towboat. Between vessel 5 and barge 1 a collection oil boom is suspended, which transports any oil on the surface into the barge. This oil boom 8 is fastened to the bow section 4 on the port side. At the starboard side, there is fastened an additional oil boom 9 which is towed by a smaller vessel 10. With the help of vessel 10 and boom 9, it is possible to collect oil all the way in to an uneven shore line 11.

To bow portion 4 of the barge, is fastened a device which accelerates water upwardly and rearwardly. In the embodiment according to FIG. 2 and 3, the device consists of a paddle wheel 12, rotating about an axis 13 which runs transversal to the longitudinal direction of the barge. The paddle wheel is run by a motor, not shown, for instance, a hydraulic motor, and is rotating in the direction of the arrow P. Thereby, the paddle wheel will throw the water upwardly across transversal bow section 4 and will entrain oil slick 14 which is floating on the water surface. The water that is thrown over bow section 4 into the barge, i.e. into tank room 3, will rapidly separate from the water, so that an upper oil slick 15 and a lower water level 16 are formed. As and when water and oil are fed, the water will automatically be forced out through a bottom opening 17 in the tank. As and when the oil slick 15 is increased in thickness, the oil slide may be transferred over to an accompanying vessel or to lateral tanks 2 by means of a pump 18.

In FIG. 4 is shown a modified embodiment, in that the paddle wheel 12 is replaced by a slanting plate 19 on whose overside is mounted, upward directed, slanting nozzles 20 to which water is fed from a pump, not shown. These water flows will, similar to the embodiment according to FIG. 3, throw the water with the oil film 14 across the edge of the bow 4 and into tank 3.

A principal advantage with the invention is that no mechanical parts come into contact with the oil film in order to channel the oil film into the vessel's tank. The paddle wheel 12 or the nozzles 20 only produce a flow in the water which causes the water and oil to be thrown across the edge of bow 4 and into the tank of the barge.

FIG. 5 shows an alternative embodiment of the collection container or barge 1, in which the receiving bow section 4 is telescoped somewhat into barge 1. FIG. 6 shows a side view of barge 1 and shows the new positioning of paddle wheel 12 in relation to receiving bow section 4. The paddle wheel 12 is mounted in a partly enclosing housing 33 which transfers water from the surrounding area in toward the paddle wheel 12. The receiving bow section 4 terminates in an edge or a threshold 35 whose height is a bit above the water surface. The drawing feature indicated by reference number 37 shows schematically a wing or a foil with its adjusting organs, structured so that the wing may be turned or tipped. Wing 37 is used to adjust the draught of the barge.

FIG. 7 shows an alternative embodiment to the one shown in FIG. 6. Instead of paddle wheel 12, a plurality of water nozzles 20 are used. These nozzles are positioned in a predetermined pattern in order to create a favourable fluid motion. Housing 33 is also designed with due regard to flow-dynamics in order to create a favourable current. Housing 33 is only partly closed to allow entrance of the surrounding water.

As illustrated in FIG. 5, 6 and 7, barge 1 is kept either in a stationary position or is towed across the water by means of booms 8. The traction force may advantageously be transferred in a lower line or wire 8, which gives a lower point of application in barge 1. In addition, the wire may be fastened to the lower skirt of the boom so that the boom will not easily give way and allow the oil to get through. In other words, this is a great help in forcing the oil film toward the receiving bow section of barge 4. The height of boom 8 may also be designed in such a way that the highest point is near barge 1 and the lowest near the shore connection or the towboat. This is because the oil slick is concentrated toward barge 1 and is expected to be increasingly thicker as it approaches barge 1. The water force will be substantial and barge 8 need not withstand greater force than strictly necessary, hence this possibility of decreasing boom height upstream.

FIG. 8 shows the receiving bow section 4 on larger scale and not in operation. As illustrated in FIG. 8, housing 33 forms an upwardly directed slit 36 through which water shall escape. FIG. 9 illustrates how the water and the oil slick behave during rotation of paddle wheel 12. Paddle wheel 12 draws water in and leads the water as illustrated by the arrows. The water is channelled through slit 36 and forms an inner water layer 31. This slit 36 is placed in such a way as to entrain a thin water slick 30 which, in turn, entrains oil slick 14 over threshold 35. As can be seen, the oil scarcely comes into contact with the equipment. If plastic bags, cans, bits of wood, etc., should float on top of the oil film, this is of no importance; everything is transported across threshold 35 without any problems,.

FIG. 10 shows the alternative embodiment on a larger scale. In the FIG. 10 embodiment, a plurality of nozzles 20 are placed on a portion 34 of house 33, designed according to flow-dynamic principles. As illustrated by the arrows, these nozzles send a flow of water toward slit 36, similar to the embodiment shown in FIG. 8 and 9. In operation the result will be the same as shown in FIG. 9. As indicated in the figure, the threshold height h from the water surface may be in the order of 150–250 mm in a practical embodiment. Slit 36 may for instance, be located approx. 50 mm below the water surface.

To prevent too much brake effect from the receiving bow section., the latter is designed with baffles which send substantial quantities of water past housing 33, both laterally and below. In a practical embodiment, paddle wheel 12 and housing 33 are designed as small as possible, which means that the draught is as shallow as possible, and as mentioned, is designed with baffles in the front, so that no large frontal wave will be formed in front of barge 1. Thus, it should be understood that only water layer 30 is led over threshold 35, and the remaining quantity of water must be led past housing 33 in the best possible flow-technical manner.

Water separation inside the barge will function in the same manner as in the embodiment shown in FIGS. 1–4.

Figure 12:
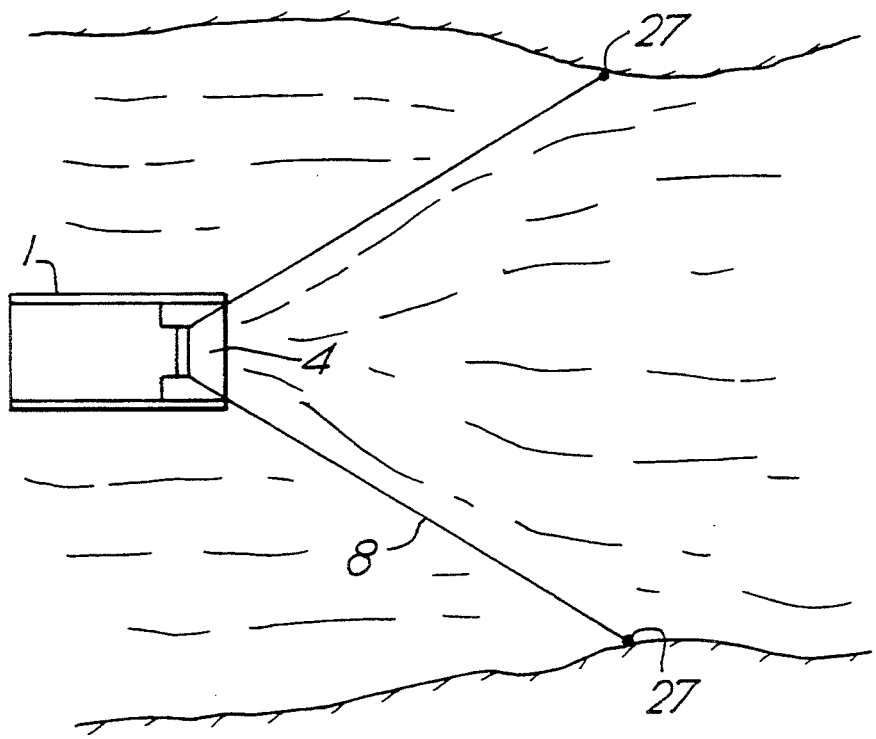
FIG. 12 shows a stationary collection container positioned in a sound where there is a current and with the collection container anchored to the shore by means of its booms.

FIGS. 11 and 12 show two different applications of the device for collection of oil slicks. In FIG. 11, barge 1 is towed by vessel 25, and booms 8 are each fastened to cantilever booms 26. This type of collection is used when there is no substantial current in the water. When there is current in the water, which often is the case in a sound, stationary equipment as shown in FIG. 12 is used. Here, barge 1 is stationary and fastened via booms 8 to shore connections 27. Such a system may also be used when tidal water is present; however, the boom must then be turned around regularly as and when the tidal water is changing direction.

I claim:

1. A method for collecting oil from an oil slick floating on a body of water, comprising;
    (a) providing a barge having a receiving bow section, a floating boom extending from said receiving bow section and oriented to capture the floating oil slick and to channel the floating oil slick towards said receiving bow section, a rotatable paddle wheel having an outer surface, a transverse threshold disposed adjacent a receiving end of said boom at a position above a surface of said body of water and above an upper extent of said paddle wheel, and an on-board oil collection container disposed to receive oil and water flowing from said body of water, over said transverse threshold;
    (b) orienting the barge relative to the body of water so as to cause said floating oil slick, and immediately underlying water of said body of water, being channeled by said floating boom, to progressively approach said transverse threshold; and
    (c) acting on said floating oil slick by rotating said paddle wheel such that a forwardly facing portion of said outer surface of said paddle wheel provides an upwardly moving surface that entrains the water immediately underlying said oil slick and thereby forces temporally successive increments of said floating oil slick and said immediately underlying water upwards from the surface of said body of water and then said upper extent of said paddle wheel and over said transverse threshold and into said on-board oil collection container.

2. The method of claim 1, further comprising:
    (d) permitting oil and water collected into said oil collection container as a result of conducting steps (a)–(c) to separate into an upper oil layer and a lower water layer; and
    (e) continuously leading water from said water layer out of said oil collection container as steps (a)–(c) continue to be conducted.

3. The method of claim 1, wherein:
    said body of water is a flowing body of water, and step (b) is conducted by orienting the barge so that the transverse threshold faces upstream.

4. The method of claim 3, wherein:
    step (b) further includes mooring the barge so that the barge is generally stationary in plan.

5. The method of claim 1, wherein:
    said body of water is substantially without a current, and step (b) is conducted by forcibly translating said barge along said body of water with said transverse threshold facing forwards relative to travel of said barge on said body of water.

6. The method of claim 1, wherein said paddle wheel has an axis of rotation disposed below the surface of said body of water and acts on said oil and water from generally below the surface of said body of water.

7. The method of claim 1, wherein:
    step (c) is conducted by causing said successive increments to flow up an inclined ramp which inclines upwards towards said transverse threshold.

8. The method of claim 1, further including:
    adjusting the draft of said barge in said body of water while conducting step (c), for thereby varying said transverse threshold in height relative to said body of water.

9. Apparatus for collecting oil from an oil slick floating on a body of water, comprising:
    a barge having a receiving bow section, a floating boom extending from said receiving bow section and oriented to capture the floating oil slick and to channel the floating oil slick towards said receiving bow section, a transverse threshold disposed adjacent a receiving end of said boom at a position above a surface of said body of water, and an on-board oil collection container disposed to receive oil and water flowing from said body of water, over said transverse threshold, said barge being arranged to be oriented in use relative to the body of water so as to cause said floating oil slick, and immediately underlying water of said body of water, being channeled by said floating boom, to progressively approach said transverse threshold; and
    a paddle wheel rotatably mounted on said barge such that an upper extent of said paddle wheel is disposed below said transverse threshold, said paddle wheel being rotatable such that a forwardly facing portion of its outer surface provides an upwardly moving surface that entrains the water immediately underlying said oil slick and thereby forces temporally successive increments of said floating oil slick and said immediately underlying water upwards from said body of water and the upper extent of said paddle wheel and over said transverse threshold and into said on-board oil collection container.

10. The apparatus of claim 9, further including:
a pump and outlet functionally connected with said oil collection container for continuously leading out of said oil collection container water from a lower water layer under an upper oil layer accumulating into and separating in said oil collection container as a result of use of said apparatus.

11. The apparatus of claim 9, further including:
means for mooring said barge so that, in use, said barge is generally stationary in plan.

12. The apparatus of claim 9, further including:
means for forcibly translating said barge along said body of water, so that, in use, said transverse threshold faces forwards relative to travel of said barge on said body of water.

13. The apparatus of claim 1, further comprising means for forcibly rotating said paddle wheel so that said forwardly facing outer surface thereof rotates upwardly and towards said transverse threshold.

14. The apparatus of claim 1, further comprising an inclined ramp which inclines upwards towards said transverse threshold and provides a path for said oil and water to follow as they are directed over said transverse threshold.

15. The apparatus of claim 9, further including:
a hydrofoil adjustably mounted to the barge for adjusting the draft of said barge in said body of water for thereby varying said transverse threshold in height relative to said body of water while collecting said increments.

16. The apparatus of claim 9, wherein:
said transverse threshold is recessed from a foremost extent of said barge, into a forwardly opening housing.

17. The apparatus of claim 10, further including:
said housing including a slot juxtaposed with said transverse threshold for limiting the thickness of said immediately underlying water.

* * * * *